US008138754B2

(12) United States Patent
Ogawa et al.

(10) Patent No.: US 8,138,754 B2
(45) Date of Patent: Mar. 20, 2012

(54) METHOD AND APPARATUS FOR TESTING CHARACTERISTICS OF THIN-FILM MAGNETIC HEAD

(75) Inventors: Akio Ogawa, Tokyo (JP); Tsutomu Chikamatsu, Tokyo (JP); Kazuyuki Kobayashi, Tokyo (JP); Haruhiko Yamaguchi, Tokyo (JP); Kazunori Matsuiwa, Tokyo (JP); Masaki Ohashi, Yokohama (JP); Kazuyoshi Nakajima, Yokohama (JP); Kiyotaka Shindo, Yokohama (JP)

(73) Assignee: TDK Corporation, Tokyo (JP)

( * ) Notice: Subject to any disclaimer, the term of this patent is extended or adjusted under 35 U.S.C. 154(b) by 411 days.

(21) Appl. No.: 12/467,335

(22) Filed: May 18, 2009

(65) Prior Publication Data

US 2009/0284857 A1    Nov. 19, 2009

(30) Foreign Application Priority Data

May 17, 2008    (JP) .................................. 2008-130235

(51) Int. Cl.
*G01R 33/12* (2006.01)
(52) U.S. Cl. ........................................................ 324/210
(58) Field of Classification Search .................... None
See application file for complete search history.

(56) References Cited

U.S. PATENT DOCUMENTS

| 6,534,974 | B1 * | 3/2003 | Bowen et al. | 324/210 |
| 6,930,850 | B2 | 8/2005 | Takagi et al. | |
| 7,119,537 | B2 * | 10/2006 | Che et al. | 324/210 |
| 7,355,393 | B2 * | 4/2008 | Tokutomi et al. | 324/210 |

FOREIGN PATENT DOCUMENTS

| JP | 2002-373476 A | 12/2002 |
| JP | 2005-93046 A | 4/2005 |

* cited by examiner

*Primary Examiner* — Paresh Patel
(74) *Attorney, Agent, or Firm* — Leydig, Voit & Mayer, Ltd.

(57) ABSTRACT

The characteristics of thin-film magnetic heads are evaluated by measuring, in a step and repeat method and apparatus, the magnetic field generated by the respective heads in a bar including multiple heads.

10 Claims, 8 Drawing Sheets

100 Apparatus for testing characteristics of Thin-Film Magentic Head
(Rough perspective view)

Writer current Frequency 10MHz

Writer current Frequency 50MHz

100 Apparatus for testing characteristics of Thin-Film Magentic Head

Wafer

Cut into Bar

Row-Bar

Cut into Sliders

Slider

FIG. 9A  Side View
Prior ART
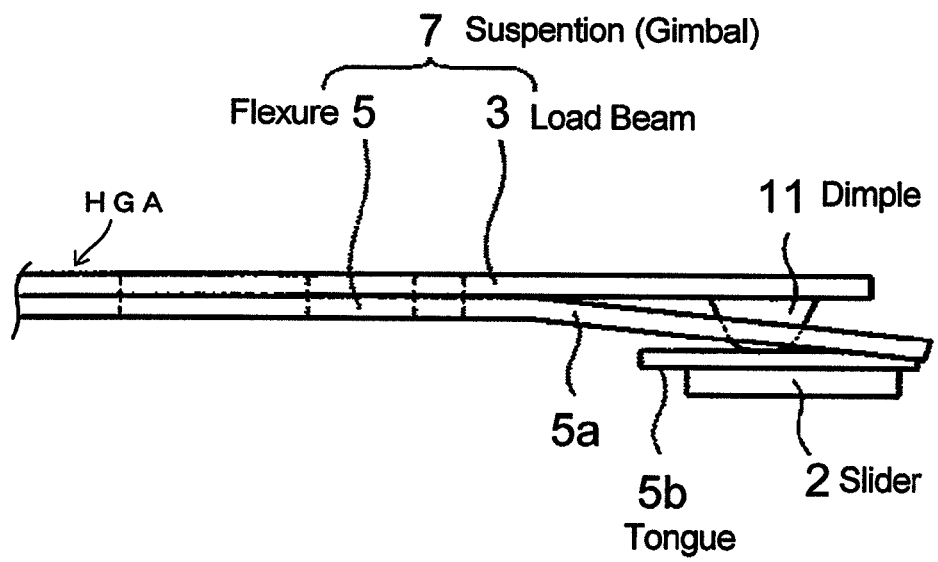
FIG. 9B  Bottom view
Prior ART
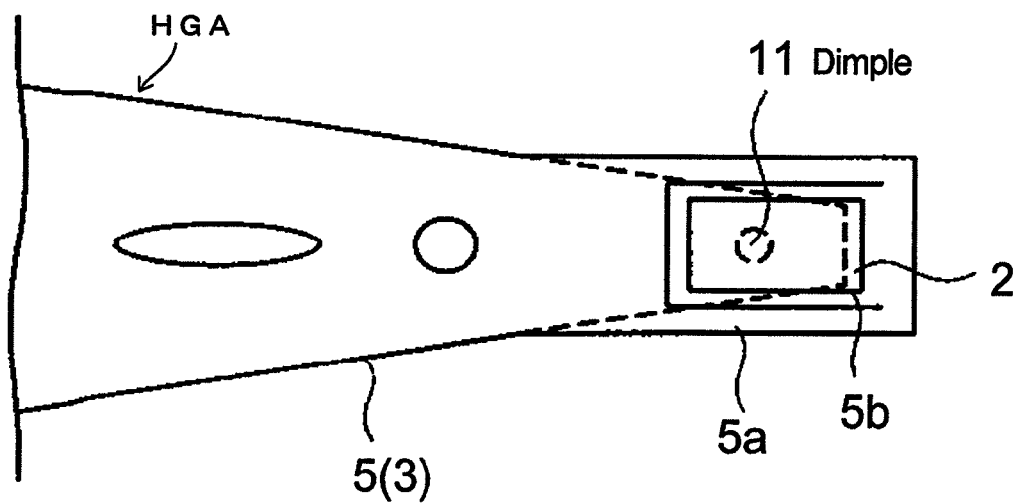

METHOD AND APPARATUS FOR TESTING CHARACTERISTICS OF THIN-FILM MAGNETIC HEAD

BACKGROUND OF THE INVENTION

1. Field of the Invention

The present invention relates to a method and apparatus for testing characteristics of a thin-film magnetic head utilized for example in a hard disk drive.

2. Description of the Related Art

A thin-film magnetic head has a write element and a read element. FIG. 6 is a sectional drawing which illustrates composition of a thin-film magnetic head. In the thin-film magnetic head 21, a write element 31 writes a signal onto a magnetic disk 50 by a magnetic field, which is generated by a current to a coil 32 in the write element 31 according to electromagnetic induction. A read element 41 reads a signal by detecting a direction of a magnetic field on the magnetic disk 50 by a magnetoresistance element 42.

FIG. 7 is a perspective view of a slider on which a thin-film magnetic head is formed. As shown in the figure, the thin-film magnetic head 21 is on an edge of the slider 2 with an electrode 22. FIG. 8A to FIG. 8C are schematic drawings of a process of manufacturing sliders. In manufacturing sliders, a lot of thin-film magnetic heads are formed on a wafer, and then the wafer is cut into bars (see FIG. 8A and FIG. 8B). Each of the bars is cut into sliders (see FIG. 8B and FIG. 8C). About eighty sliders are included in the bar. Namely, about eighty thin-film magnetic heads are in the bar. Hereinafter, each of the bars is referred to as "row-bar".

As shown in FIG. 9A and FIG. 9B, the slider 2 is part of Head Gimbal Assembly (HGA). Namely, the slider 2 is fit to a suspension 7 (Gimbal) having a load beam 3 and a flexure 5. The load beam 3 consists of a metal plate spring. A dimple 11 projecting toward flexure 5 is on a tip side of the load beam 3. The load beam 3 and the flexure 5 are united with each other except tip sides thereof by for example welding to constitute the suspension 7. The flexure 5 includes a main body 5a and a tongue 5b which is rectangular. The tongue 5b is connected to the main body 5a at one side thereof near a tip of the main body 5a, while the other sides thereof are cut from the main body 5a. A backside of the tongue 5b is biased (pressed) by dimple 11 so that the tongue 5b is parallel to the load beam 3. The slider 2 is fixed on the tongue 5b and biased by dimple 11 through the tongue 5b so that a position thereof is appropriately maintained to write and read a signal.

In a hard disk drive (HDD), a signal is written on and read from a magnetic disk while the magnetic disk, which is rotating at high speed, and a slider of an HGA are not touching each other. A final test of the HGA should be done in a same condition as a signal is actually written on and read from a magnetic disk in. The final test is often called a dynamic performance test. Various methods for the dynamic performance test of an HGA are suggested. Generally, a result of writing (or recording) a signal on and reading (or reproducing) a signal from a medium, which may be only for a test and may not be for an actual use, by an HGA is compared with an original signal, and then characteristics of the HGA is evaluated based on an output level and lack of a bit. Hereafter, the medium, which may be only for a test and may not be for an actual use, is referred to as "false medium".

An apparatus for testing characteristics of an HGA is disclosed in Japanese Patent Application Laid-Open No. 2002-373476.

In case an HGA does not pass the final test, expensive parts thereof like suspension and so on should be abandoned. That causes a cost increase. Therefore, it is desirable that a rate at which an inferior HGA are found in the final test is lowered as much as possible. It is thought that a thin-film magnetic head of bad quality is one of the reasons for the HGA not to pass the final test. One of the factors that the thin-film magnetic head is bad quality is an inferior write element or an inferior read element.

Concerning a read element, characteristics (static characteristics) can be obtained by applying an external magnetic field so a quasi-static-test can be done not only in a process after a row-bar is cut into sliders but also in a former process where the read element is included in a row-bar or a wafer. Therefore, there is a relatively high probability that a slider having a thin-film magnetic head whose read element is bad quality can be removed in a former process. Namely, there is a relatively low probability that a read element is bad quality is in the final test of an HGA.

On the other hand, when evaluating characteristics of a write element, a gap between a magnetic disk and a thin-film magnetic head should be controlled with precision, so it is difficult to test a write element before the final test of the HGA. Therefore, in the present state, whether a write element is good or bad has to be judged only in the final test of the HGA. This means that the probability of an inferior write element in the final test of the HGA is higher than that of an inferior read element.

Above mentioned problem is serious especially in perpendicular magnetic recording (PMR) because a yield rate in PMR is lower than that in longitudinal magnetic recording (LMR). The reason is that record density in PMR is higher (namely, energy distribution therein is narrower) than that in LMR. Further, in PMR a gap between a magnetic disk and a thin-film magnetic head should be controlled in nanometers, so it is more difficult in PMR than in LMR to test a write element before the final test of the HGA. Also, even in PMR there is a relatively low probability, as above mentioned, that a read element is bad quality in the final test of an HGA because the principle of reading a signal in PMR is same as that in LMR.

SUMMARY OF THE INVENTION

The present invention has been made in view of the foregoing circumstances and problems, and an object thereof is to provide a method and apparatus for testing characteristics of a thin-film magnetic head that can test write characteristics of a thin-film magnetic head without using a false medium and that more particularly can test write characteristics of a thin-film magnetic head before a final test of an HGA.

A first embodiment of the present invention relates to a method for testing characteristics of thin-film magnetic head. The method uses a sensor unit having a magnetic sensor and uses a bar integrally having a plurality of thin-film magnetic heads which are arranged in a row and each of which includes a write element and a read element. The bar can be cut into a plurality of sliders, each of which has one of the plurality of thin-film magnetic heads. In the method, first and second directions are parallel to a magnetic-field-generating surface of the write element, and a third direction is perpendicular to the first and second directions. The method comprises: a first step of slightly moving in the third direction a relative position of the sensor unit to a predetermined write element on the bar while a position of the sensor unit is fixed to a predetermined position concerning the first and second directions and while the magnetic sensor measures a magnetic field generated by the predetermined write element, and fixing the relative position of the sensor unit to the predetermined write element concerning the third direction, so that a measured value of the magnetic field read by the magnetic sensor at the predetermined position concerning the first and second directions satisfies a predetermined condition; a second step of changing in the first and second directions within a predetermined area the relative position of the sensor unit to the predetermined write element, while the relative position concerning the third direction fixed in the first step is maintained; a third step in which the magnetic sensor reads a magnetic field generated by the predetermined write element at the relative position changed in the second step; and a fourth step of evaluating, after doing the first step to the third step predetermined times, characteristics of the predetermined write element based on measured values of the magnetic field read by the magnetic sensor at each of a plurality of relative positions concerning the first and second directions. In the method, the first step to the fourth step are done for a plurality of write elements included in the bar.

In the method according to the first embodiment, the predetermined condition may be that the measured value of the magnetic field generated by the predetermined write element is above a predetermined value.

In the method according to the first embodiment, the predetermined condition may be that an increasing rate of the measured value of the magnetic field generated by the predetermined write element while the relative position of the sensor unit to a predetermined write element is slightly moved is below a predetermined value.

In the method according to the first embodiment, the sensor unit may further have a magnetic field generator; in the third step, a predetermined read element on the bar may read a magnetic field generated by the magnetic field generator; and in the forth step, characteristics of the predetermined read element may be further evaluated.

A second embodiment of the present invention relates to an apparatus for testing characteristics of thin-film magnetic head. The apparatus comprises: a holding unit which holds a bar at a predetermined position, the bar integrally having a plurality of thin-film magnetic heads which are arranged in a row and each of which includes a write element and a read element, the bar which can be cut into a plurality of sliders, each of which has one of the plurality of thin-film magnetic heads; a sensor unit having a magnetic sensor which reads magnetic fields generated by a write element on the bar; a relative position controller which controls a relative position between the sensor unit and the write element; and an evaluating unit which evaluates characteristics of the write element based on measured values of the magnetic fields read by the magnetic sensor at each of a plurality of relative positions controlled within a predetermined area by the relative position controller. The relative position controller includes: a straight moving unit which relatively moves the sensor unit in a direction parallel to a longitudinal direction of the bar; first and second slightly moving units which relatively and slightly move the sensor unit in first and second directions respectively, the first and second directions being parallel to a magnetic-field-generating surface of the write element; and a third slightly moving unit which relatively and slightly moves the sensor unit in a third direction perpendicular to the magnetic-field-generating surface of the write element. In the apparatus, the third slightly moving unit relatively and slightly moves the sensor unit in the third direction to fix concerning the third direction a relative position of the sensor unit to the write element, while a position of the sensor unit is fixed to a predetermined position concerning the first and second directions and while the magnetic sensor measures a magnetic field generated by the write element, so that a measured value of the magnetic field read by the magnetic sensor at the predetermined position concerning the first and second directions satisfies a predetermined condition; the evaluating unit evaluates characteristics of the write element based on measured values of the magnetic fields read by the magnetic sensor at each of the plurality of relative positions, which are concerning the first and second directions and controlled by the first and second slightly moving units while the relative position of the sensor unit concerning the third direction is fixed; and characteristics of a plurality of write elements on the bar is evaluated.

In the apparatus according to the second embodiment, the predetermined condition may be that the measured value of the magnetic field generated by the write element is above a predetermined value.

In the apparatus according to the second embodiment, the predetermined condition may be that an increasing rate of the measured value of the magnetic field generated by the write element while the relative position of the sensor unit to a write element is slightly moved is below a predetermined value.

In the apparatus according to the second embodiment, at least one of the first to third slightly moving units may have a piezoelectric element.

In the apparatus according to the second embodiment, for evaluating characteristics of the write element the evaluating unit compares a predetermined standard value and an output value from the magnetic sensor reading the magnetic field generated by the write element.

In the apparatus according to the second embodiment, the sensor unit may further have a magnetic field generator generating a magnetic field, and the evaluating unit may further evaluate characteristics of the read element based on a result of reading the magnetic field by the read element.

It is to be noted that any arbitrary combination of the above-described structural components as well as the expressions according to the present invention changed among a system and so forth are all effective as and encompassed by the present embodiments.

According to the embodiments described above, a relative position between a magnetic sensor and a write element of a thin-film magnetic head is changed within a predetermined area, and then characteristics of the write element is evaluated based on the magnetic field which is generated by the write element and read by the magnetic sensor at a plurality relative positions changed, so it is not required to use a false medium unlike a final test of an HGA and it is possible to test write characteristics of the thin-film magnetic head before a final test of an HGA.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, the drawings in which:

FIG. 9A is a side view of an HGA and FIG. 9B is a bottom view thereof.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

Figure 1:
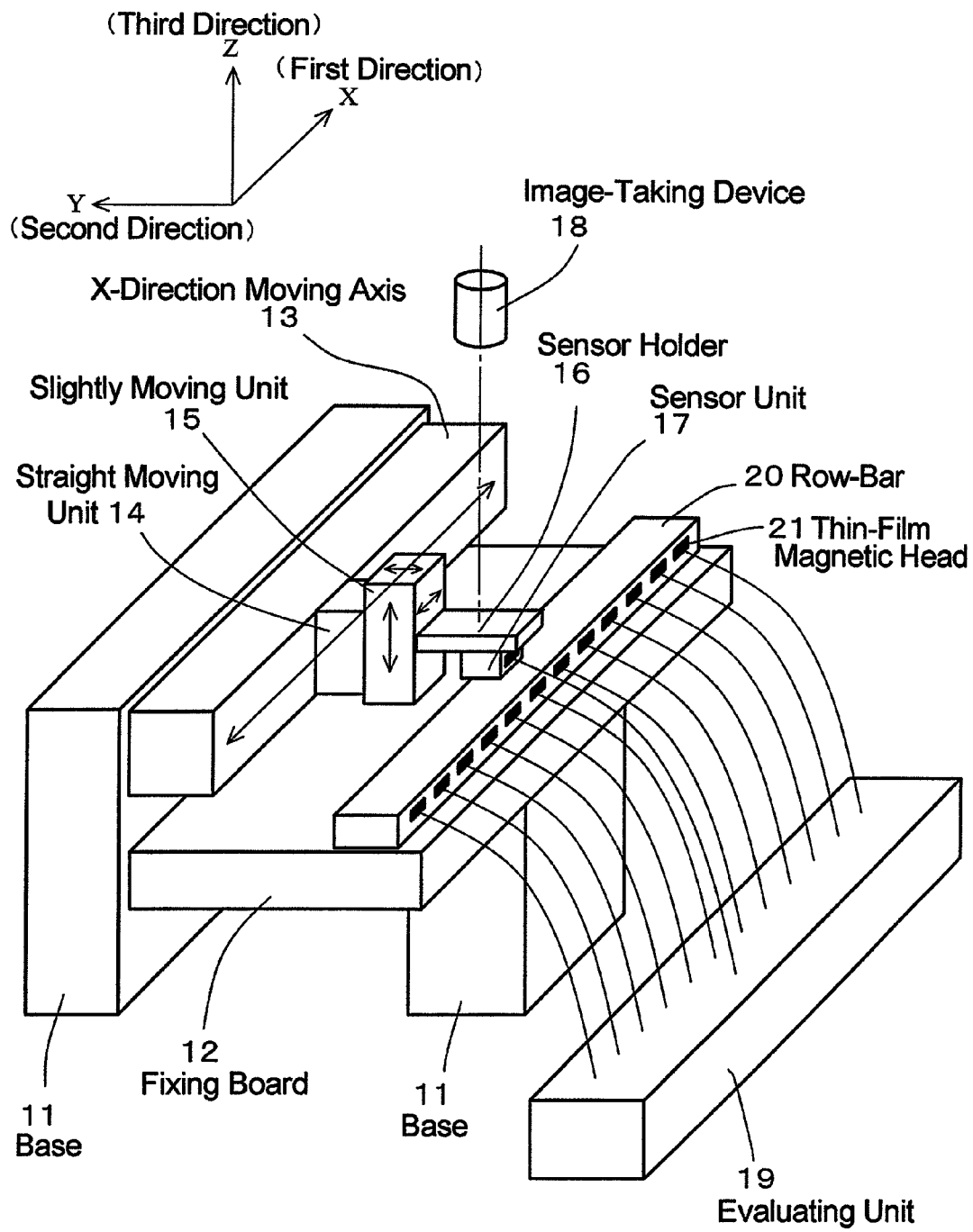
FIG. 1 is a rough perspective view of an apparatus for testing characteristics of thin-film magnetic head according to an embodiment of the present invention.

FIG. 1 is a rough perspective view illustrating composition of an apparatus 100 for testing characteristics of thin-film magnetic head according to an embodiment of the present invention. Here, two directions which are perpendicular to each other in a horizontal plane are defined as first and second directions (X-direction and Y-direction), and a vertical direction is defined as a third direction (Z-direction). The apparatus 100 includes a base 11, a fixing board 12 as a holding unit, an X-direction moving axis 13, a straight moving unit 14, a slightly moving unit 15 as first to third slightly moving units, a sensor holder 16, a sensor unit 17, an image-taking device 18, and an evaluating unit 19.

The fixing board 12 supported by the base 11 holds for example by vacuum adsorption a row-bar 20 so that its generating surface from which a magnetic field is generated is topside. Held by the fixing board 12, a longitudinal direction of the row-bar 20 is parallel to the X-direction, and the generating surface (i.e. magnetic-field-generating surface) thereof is almost parallel to the XY-plane. Note that the vacuum adsorption may be changed for a mechanical chuck. An upper surface of the fixing board 12, namely a surface holding the row-bar 20, is flat (concerning the Z-direction) enough to keep the row-bar 20 and the sensor unit 17 within a predetermined distance which allows the row-bar 20 and the sensor unit 17 to measure a magnetic field of each other. The row-bar 20 integrally has a plurality of thin-film magnetic heads 21 which are arranged in a row and each of which includes a write element and a read element. The row-bar 20 can be cut into a plurality of sliders, each of which has one of the plurality of thin-film magnetic heads 21.

The X-direction moving axis 13 is supported by the base 11 to be parallel to the X-direction. The straight moving unit 14 is held by the X-direction moving axis 13 to be slidable in the X-direction. The slightly moving unit 15 is held by (mounted on) the straight moving unit 14. The slightly moving unit 15 which has for example piezoelectric elements supports the sensor holder 16 and can slightly move it in the X, Y and Z directions with precision for example in nanometers. The sensor unit 17 is fixedly held by the sensor holder 16 so that its generating surface from which a magnetic field is generated is bottom side. Therefore, the sensor unit 17 can move in the X-direction along with the straight moving unit 14 moving straight in the X-direction and can slightly move in the X, Y and Z directions (the first to third directions) owing to support by the slightly moving unit 15. Note that the sensor unit 17 has same functions as a magnetic head, namely has a magnetic field generator corresponding to a write element and a magnetic sensor corresponding to a read element. The generating surface (i.e. magnetic-field-generating surface) of the sensor unit 17 held by the sensor holder 16 faces the generating surface of the row-bar 20 in parallel. The sensor unit 17 and the row-bar 20 are within a predetermined distance from each other to be able to detect a magnetic field generated by each other.

Figure 2:
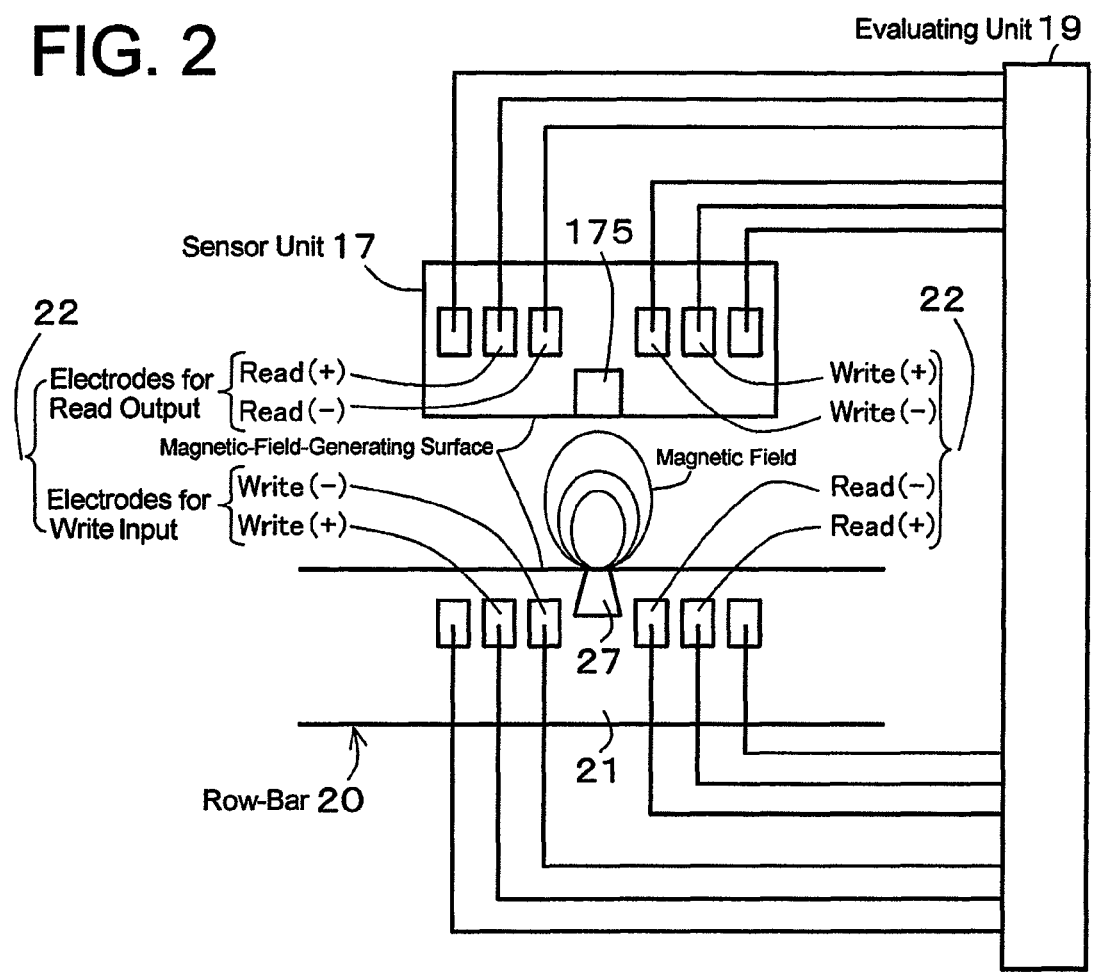
FIG. 2 is an enlarged partial side view of FIG. 1.

The image-taking device 18 which is held above the sensor unit 17 and the row-bar 20 (holding means for the device 18 is not shown) can be utilized for positioning the row-bar 20 or positioning the sensor unit 17 against the row-bar 20. The evaluating unit 19 is electrically connected to electrodes of the sensor unit 17 and electrodes of the thin-film magnetic heads 21 on the row-bar 20. Namely, as shown in FIG. 2, a probe of the evaluating unit 19 touches electrodes 22 of the sensor unit 17 and of the each thin-film magnetic head 21. A current-generating means in the evaluating unit 19 provides a current to generate a magnetic field between write-input-electrodes of the each thin-film magnetic head 21. And then write characteristics of the each thin-film magnetic head 21 is evaluated by a judging unit in the evaluating unit 19 based on the result (i.e. a voltage between read-output-electrodes of the sensor unit 17 generated by electromagnetic conversion) obtained by detecting the generated magnetic field of the each thin-film magnetic head 21 by the sensor unit 17. Further, the current-generating means in the evaluating unit 19 provides a current to generate a magnetic field between write-input-electrodes of the sensor unit 17, and then read characteristics of the each thin-film magnetic head 21 is evaluated by the judging unit in the evaluating unit 19 based on the result (i.e. a voltage between read-output-electrodes of the each thin-film magnetic head 21 generated by electromagnetic conversion) obtained by detecting the generated magnetic field of the sensor unit 17 by the each thin-film magnetic head 21.

Figure 3:
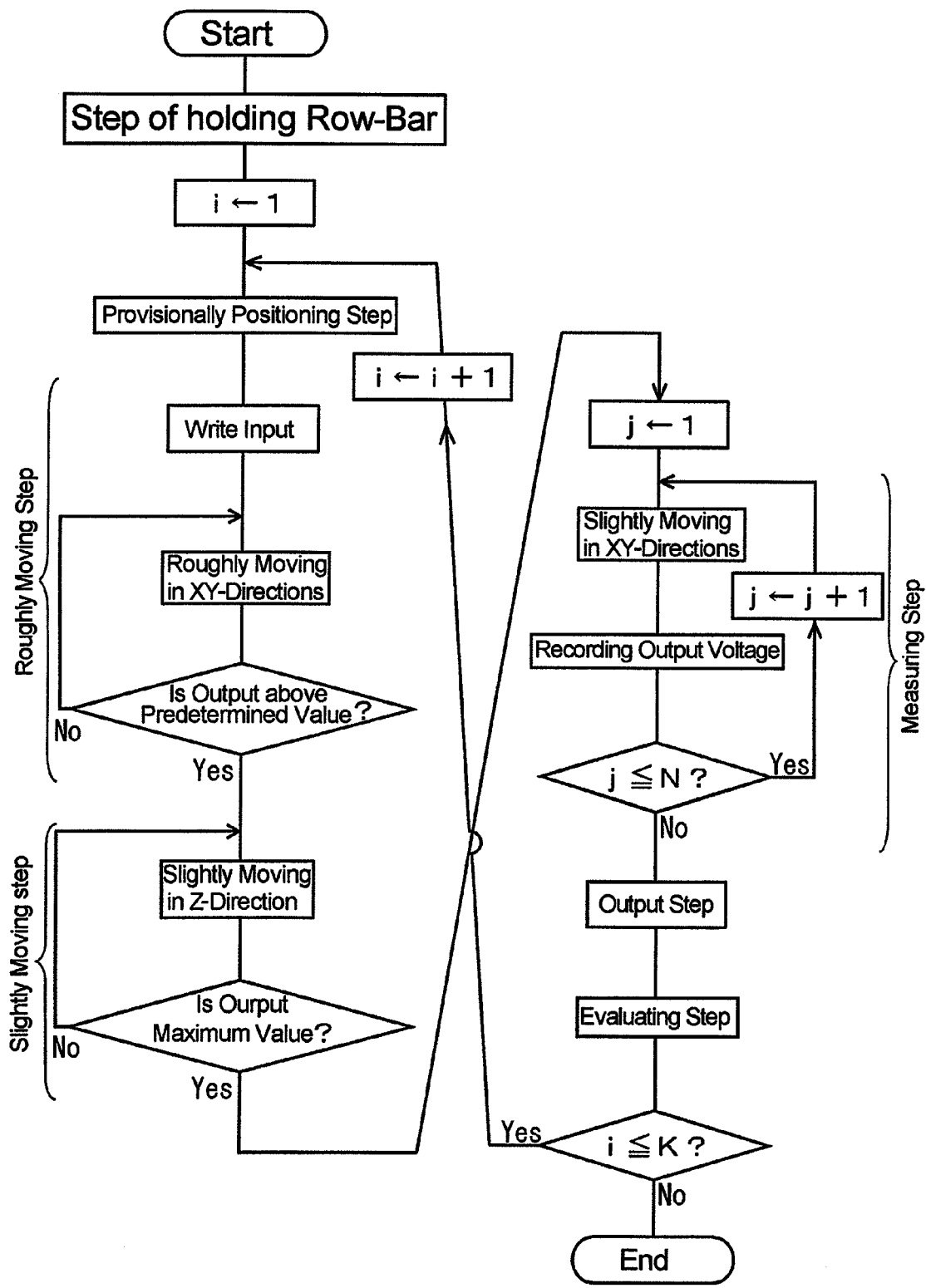
FIG. 3 is a flowchart showing a process of testing characteristics of thin-film magnetic heads by the apparatus shown in FIG. 1.

FIG. 3 is a flowchart showing a process of testing characteristics of thin-film magnetic heads by the apparatus 100 shown in FIG. 1. Hereafter, explanation of the process will be given also referring the FIG. 1 and FIG. 2, and the number of thin-film magnetic heads 21 is defined as "K" and the number of measuring points per one thin-film magnetic head 21 where a magnetic field is measured is defined as "N".

In a step of holding a row-bar, the row-bar 20 is arranged on the upper surface of the fixing board 12 by hands or by a conveyance mechanism, and then the row-bar 20 is held by the fixing board 12 by for example vacuum adsorption. At this point, a measuring object (a thin-film magnetic head) of the row-bar 20 can be positioned roughly on the fixing board 12 by manipulating images taken by the image-taking device 18.

In a provisionally positioning step, the straight moving unit 14 is moved straight along the X-direction moving axis 13 so that the sensor unit 17 is provisionally positioned to face I-th thin-film magnetic head 21 ($1 \leq I \leq K$). Here, the amount of movement of the straight moving unit 14 may be based on a predetermined value or on a result obtained by manipulating images taken by the image-taking device 18.

In a roughly moving step, the current-generating means in the evaluating unit 19 provides a write-electrical-signal (i.e. a current to generate a magnetic field) for I-th thin-film magnetic head 21; and then while the sensor unit 17 reads the magnetic field generated by I-th thin-film magnetic head 21, the slightly moving unit 15 is roughly moved in the X-direction and the Y-direction so that a read-output-voltage output from the sensor unit 17 as a result of reading the magnetic field satisfies a predetermined condition. The predetermined condition may be that the measured value of the magnetic field generated by I-th thin-film magnetic head 21 is above a predetermined value. After the roughly moving step, a pole 27 of I-th thin-film magnetic head 21 and a magnetoresistance element 175 (an MR-element) of the sensor unit 17 almost squarely face each other. Note that the step of roughly moving may be done while the sensor unit 17 is touching the row-bar 20.

In a slightly moving step, the slightly moving unit 15 is moved in the Z-direction to heighten the read-output-voltage. Under normal conditions, the read-output-voltage heightens when a distance between the MR-element 175 of the sensor unit 17 and the pole 27 of I-th thin-film magnetic head 21 is shortened. Here, the slightly moving unit 15 is slightly moved in the Z-direction to the point where the read-output-voltage satisfies a predetermined condition. For example the predetermined condition is that the read-output-voltage is maximum value or near the maximum value; that the read-output-voltage is above a predetermined value; or that an increasing rate of the read-output-voltage while the slightly moving unit 15 is slightly moved in the Z-direction is below a predetermined value. Now a position of the slightly moving unit 15 concerning the Z-direction is finished. Note that "near the maximum value" can be experimentally determined.

In a measuring step, the slightly moving unit 15 is moved in the X-direction and the Y-direction by a predetermined value, and then the read-output-voltage from the sensor unit 17 is recorded. This is repeated N times, so the read-output-voltages from the sensor unit 17 sequentially positioned at N points are recorded as measured values.

Figure 4A:
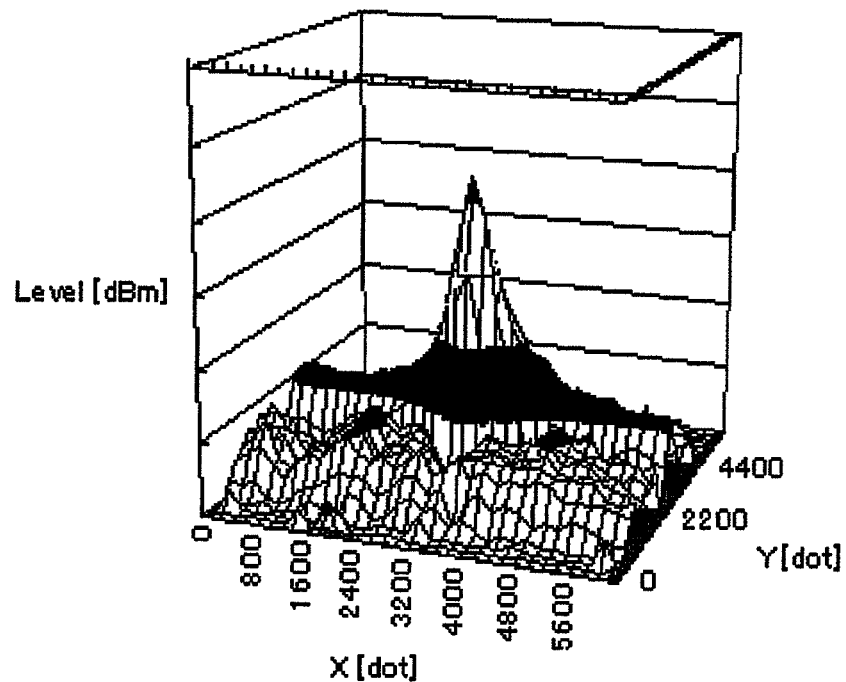
FIGS. 4A-4B illustrate output obtained in a test according to the embodiment.
Figure 4B:
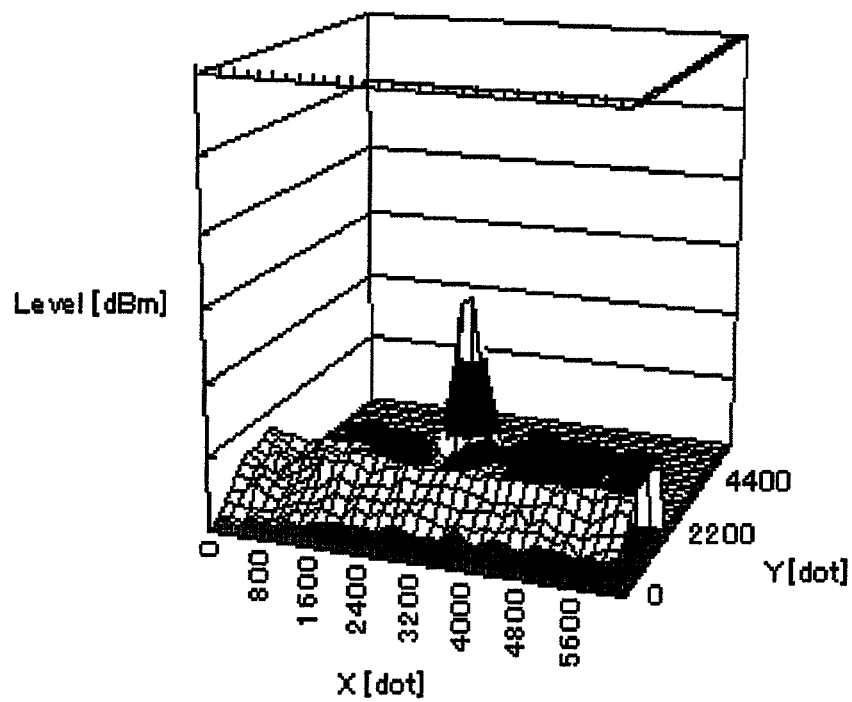

In an outputting step, a result of measurement in the measuring step is outputted. Examples of the output are shown in FIGS. 4A-4B. FIG. 4A is about the case where frequency of a current (write-current) to generate a magnetic field is 10 MHz. FIG. 4B is about the case where frequency of the write-current is 50 MHz.

In an evaluating step, the judging unit in the evaluating unit 19 evaluates write characteristics of I-th thin-film magnetic head 21 based on a result of measurement in the measuring step. More precisely, the measurement result (output value) and a predetermined standard value, which corresponds to for example required strength and range, are compared to judge whether I-th thin-film magnetic head 21 is good or bad.

Generally, each step above explained is done for all of the K thin-film magnetic heads 21 on the row-bar 20. Note that while a sequence of the steps above explained is to test write characteristics (recording characteristics) of the thin-film magnetic heads 21, it is possible to test read characteristics (reproducing characteristics) of the thin-film magnetic heads 21 along with the write characteristics thereof. In this case, in the measuring step, after recording the read-output-voltage from the sensor unit 17; the current-generating means provides a write-electrical-signal (i.e. a current to generate a magnetic field) for the sensor unit 17; and then the magnetic field generated by the sensor unit 17 is read by I-th thin-film magnetic head 21; and then a voltage thus obtained is additionally recorded. The evaluating unit 19 also evaluates read characteristics of the thin-film magnetic heads 21 (characteristics of the read element thereof).

As a result of the embodiment of the present invention, the following effects can be obtained.

(1) The sensor unit 17 reads at N points near the thin-film magnetic head 21 the magnetic field generated by the thin-film magnetic head 21 which is held at a predetermined position and which is provided with the write-electrical-signal, and then the evaluating unit 19 evaluates the write characteristics of the thin-film magnetic head 21 (characteristics of the write element thereof) based on the read-output-voltage at each of the N points, so it is not required to use a false medium unlike a final test of an HGA. And, as the thin-film magnetic head 21 whose write characteristics are bad is removed before the final test of the HGA, there is low probability that the thin-film magnetic head 21 whose write characteristics are bad is in the final test of the HGA. This means that a great advantage is given in reducing cost because the case where expensive parts of the HGA like suspension and so on should be abandoned due to the thin-film magnetic head whose write characteristics are bad is decreased.

(2) The write characteristics of each thin-film magnetic head can be tested in a process of row-bar, namely in a process before a row-bar is cut into sliders, so the test efficiency is high because handling of the row-bar is easier than that of divided sliders.

(3) The test is high-reliability because a relative position of the sensor unit 17 to thin-film magnetic head 21 is controlled by the slightly moving unit 15 which can slightly move with precision.

(4) The test is efficient because read characteristics of the thin-film magnetic head 21 can be tested, as above explained, along with write characteristics thereof.

Hereafter, composition of the apparatus 100 according to the embodiment is more specifically explained.

Figure 5:
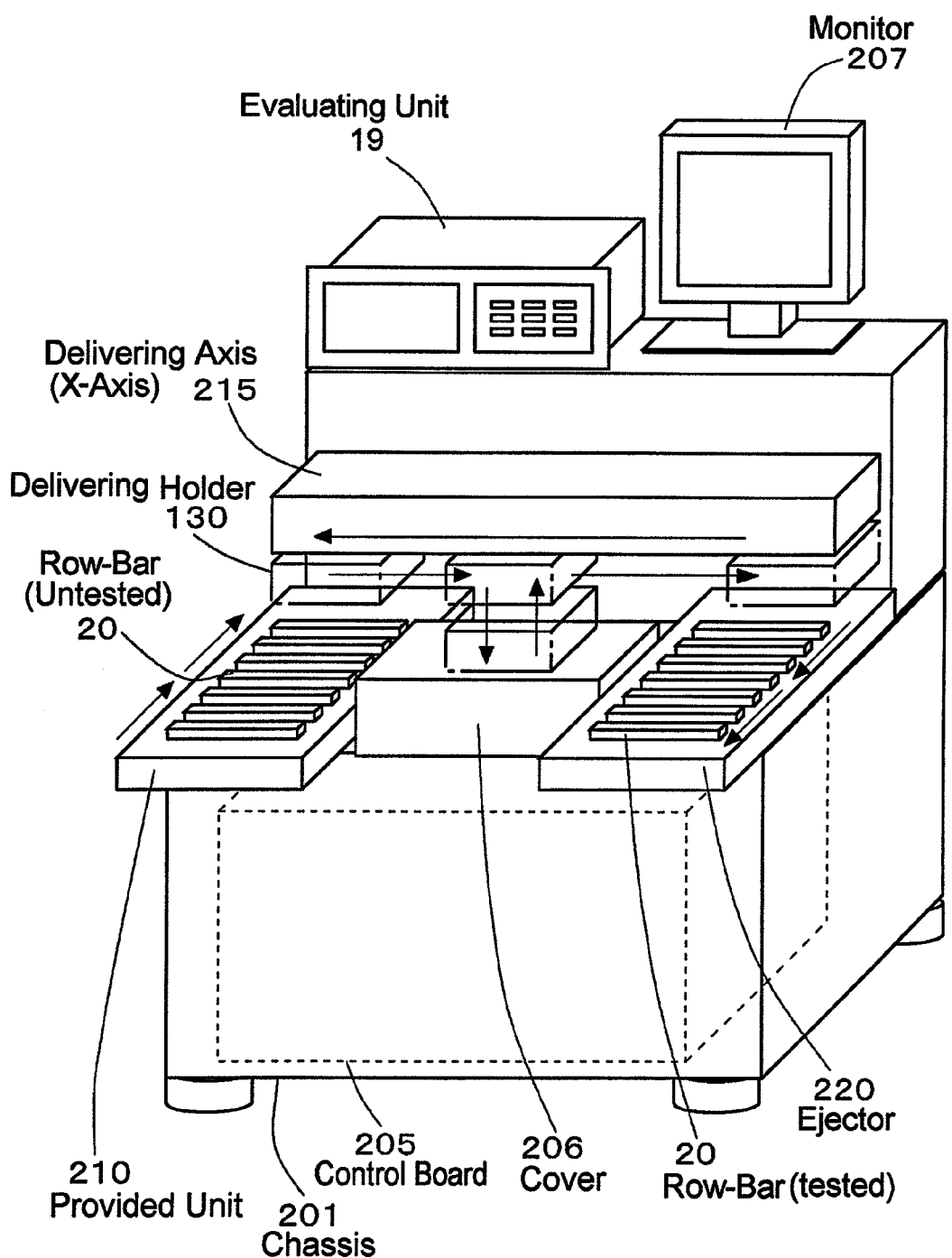
FIG. 5 is a perspective view illustrating specific composition of the apparatus shown in FIG. 1.
Figure 6:
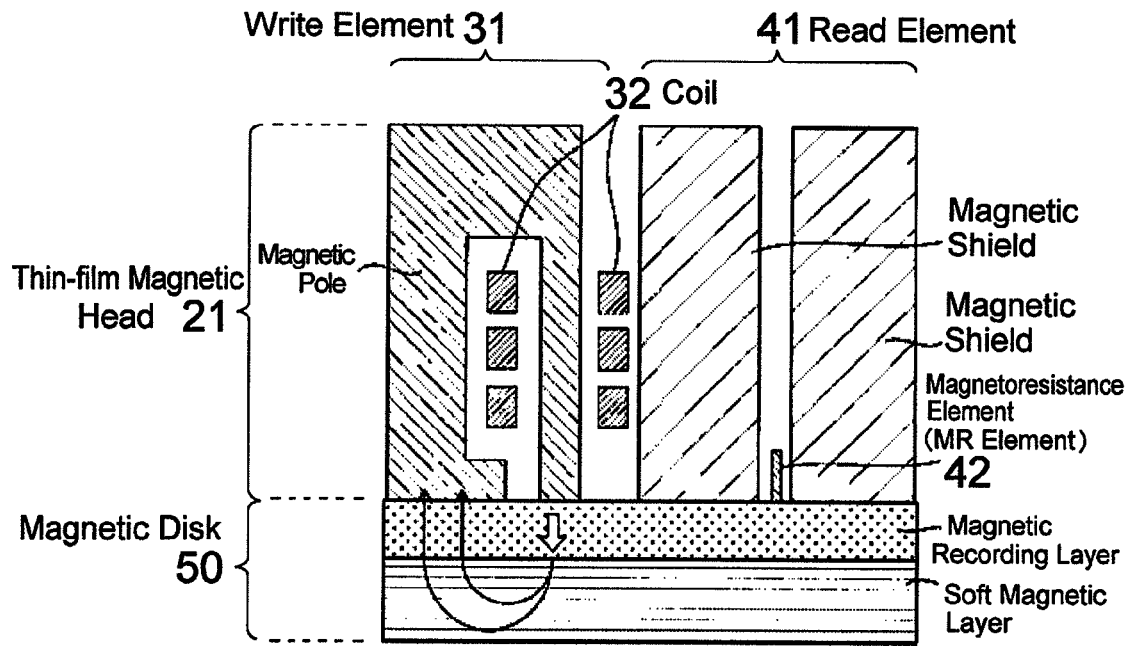
FIG. 6 is a sectional drawing illustrating composition of a thin-film magnetic head.
Figure 7:
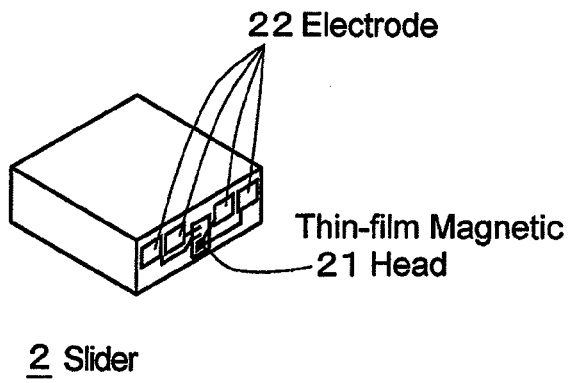
FIG. 7 is a perspective view illustrating a slider on which the thin-film magnetic head is formed.
Figure 8A:
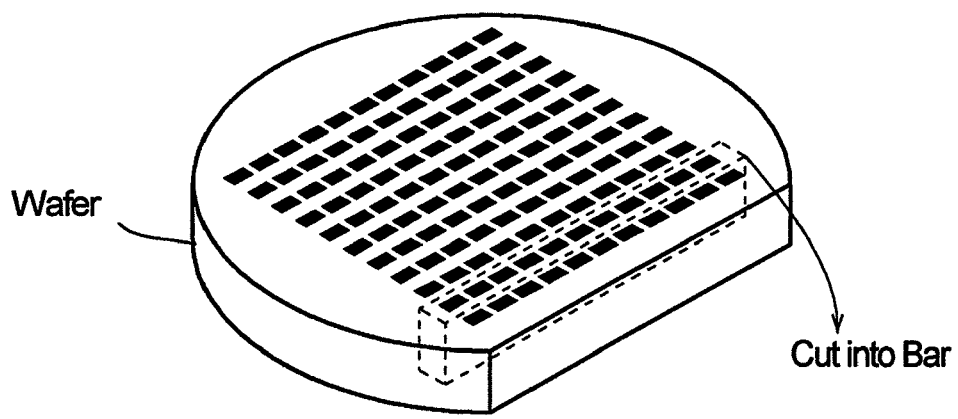
FIGS. 8A-8C schematically show a process of manufacturing a slider.
Figure 8B:
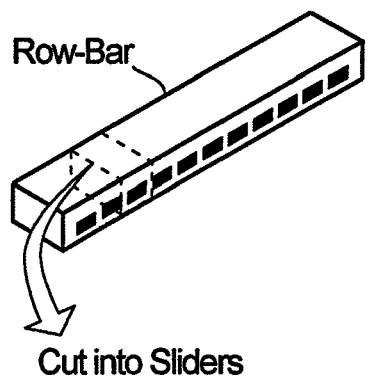
Figure 8C:
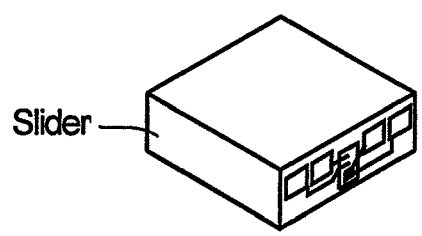

FIG. 5 is a perspective view illustrating specific composition of the apparatus 100 shown in FIG. 1. In this figure, the composition of the apparatus 100 which automatically provides, tests and ejects the row-bar 20 is illustrated.

An upper surface of a chassis 201 is a work space of the apparatus 100. A control board 205 in the chassis 201 controls behavior of the apparatus 100 totally. A cover 206 covers members shown in FIG. 1 except the evaluating unit 19. A providing unit 210 is sequentially provided with row-bars 20, which are not yet tested, and conveys the row-bars 20 under a delivering holder 130. The delivering holder 130 can move along a delivering axis 215 (X-axis), and can move up and down by a movement mechanism in itself. An ejector 220 ejects the row-bars 20, which are already tested, to outside. A monitor 207 informs a user of a result of the test and a condition of the whole apparatus 100.

A behavior of the apparatus 100 shown in FIG. 5 is explained next. The delivering holder 130 holds the row-bar 20, which is conveyed by the providing unit 210 and which is not yet tested; moves along the delivering axis 215 to the right to be above the fixing board 12, which is shown in FIG. 1 and which is inside the cover 206 in FIG. 5; and then moves down through an aperture of an upper side of the cover 206 to arrange the row-bar 20 on the fixing board 12. After the row-bar 20 on the fixing board 12 is tested as above explained, the delivering holder 130 holds the row-bar 20 again, moves up, moves along the delivering axis 215 to the right to be above the ejector 220, and then release the row-bar 20 on the ejector 220.

Described above is an explanation based on the embodiments. The description of the embodiments is illustrative in nature and various variations in constituting elements and processes involved are possible. Those skilled in the art would readily appreciate that such variations are also within the scope of the present invention.

While the roughly moving step in the embodiment is that the sensor unit 17 is moved straight in the X-direction by moving straight the straight moving unit 14 along the X-direction moving axis 13, the roughly moving step may be that the row-bar 20 is moved straight in the X-direction. Namely, it is only necessary in the roughly moving step that a relative position concerning the X-direction (the longitudinal direction of the row-bar 20) between the sensor unit 17 and the thin-film magnetic head 21 can be changed, so which of the sensor unit 17 and the row-bar 20 to move can be determined to meet conditions of designing the apparatus.

While the sensor unit 17 in the embodiment has same functions as a magnetic head, the sensor unit 17 may be a magnetic sensor which does not have a function to generate a magnetic head but a function to read one. Even in that case, write characteristics of the thin-film magnetic head can be tested.

While the slightly moving unit 15 in the embodiment has a piezoelectric element; the slightly moving unit 15 may have, instead of the piezoelectric element, a linear motor or a mechanism in which a ball screw is driven by a servomotor to rotate.

What is claimed is:

1. A method for testing characteristics of a thin-film magnetic head, the method using a sensor unit having a magnetic sensor and testing a bar integrally including a plurality of thin-film magnetic heads which are arranged in a row and each of which includes a write element and a read element, the bar being severable into a plurality of sliders, each slider including one of the thin-film magnetic heads, wherein first and second directions are parallel to a magnetic-field-generating surface of the write element, and a third direction is perpendicular to the first and second directions, the method comprising:

moving, in the third direction, position of the sensor unit relative to a predetermined write element on the bar while the sensor unit is fixed at a predetermined position with respect to the first and second directions, and, at the same time, measuring with the magnetic sensor the magnetic field generated by the predetermined write element, and fixing the position of the sensor unit relative to the predetermined write element with respect to the third direction, so that the magnetic field measured by the magnetic sensor at the predetermined position, with respect to the first and second directions, satisfies a predetermined condition;

changing in the first and second directions, within a predetermined area, the position of the sensor unit relative to the predetermined write element, while maintaining fixed the relative position with respect to the third direction;

after changing the position of the sensor unit, measuring, with the magnetic sensor, the magnetic field generated by the predetermined write element;

repeating the foregoing three steps a predetermined number of times and evaluating characteristics of the predetermined write element based on the magnetic fields measured by the magnetic sensor at each of the relative positions, with respect to the first and second directions; and repeating the foregoing four steps for each of the plurality of write elements included in the bar.

2. The method for testing characteristics of a thin-film magnetic head according to claim 1, wherein the predetermined condition is that the magnetic field measured, and generated by the predetermined write element, exceeds a predetermined value.

3. The method for testing characteristics of a thin-film magnetic head according to claim 1, wherein the predetermined condition is that the magnetic field measured, and generated by the predetermined write element, increases at a rate, while the relative position of the sensor unit to a predetermined write element is moved, below a predetermined value.

4. The method for testing characteristics of a thin-film magnetic head according to claim 1, wherein the sensor unit includes a magnetic field generator;

in measuring the magnetic field with the magnetic sensor, measuring with a predetermined read element on the bar, the magnetic field generated by the magnetic field generator; and in repeating the foregoing three steps, evaluating characteristics of the predetermined read element.

5. An apparatus for testing characteristics of a thin-film magnetic head, comprising:

a holding unit which holds a bar at a predetermined position, the bar integrally including a plurality of thin-film magnetic heads which are arranged in a row, each of the magnetic heads including a write element and a read element, the bar being severable into a plurality of sliders, each slider including one of the plurality of thin-film magnetic heads;

a sensor unit including a magnetic sensor which measures magnetic fields generated by a write element on the bar;

a relative position controller which controls position of the sensor unit relative to the write element; and an evaluating unit which evaluates characteristics of the write element based on the magnetic fields measured by the magnetic sensor at each of a plurality of relative positions controlled within a predetermined area by the relative position controller, wherein the relative position controller includes:

a straight moving unit which moves the sensor unit in a direction parallel to a longitudinal direction of the bare relative to the write unit, first and second moving units which move the sensor unit in first and second directions respectively, relative to the write unit, the first and second directions being parallel to a magnetic-field-generating surface of the write element, and a third moving unit which moves the sensor unit in a third direction, perpendicular to the magnetic-field-generating surface of the write element, relative to the sensor unit, and the third moving unit moves the sensor unit in the third direction to fix, with respect to the third direction, the position of the sensor unit relative to the write element, while the position of the sensor unit is fixed at a predetermined position with respect to the first and second directions and while the magnetic sensor measures the magnetic field generated by the write element, so that the magnetic field measured by the magnetic sensor at the predetermined position, with respect to the first and second directions, satisfies a predetermined condition, and the evaluating unit evaluates characteristics of the write element based on the magnetic fields measured by the magnetic sensor at each of the plurality of relative positions, with respect to the first and second directions, and controlled by the first and second moving units while the relative position of the sensor unit, with respect to the third direction, is fixed, whereby characteristics of the plurality of write elements on the bar are evaluated.

6. The apparatus for testing characteristics of a thin-film magnetic head according to claim 5, wherein the predetermined condition is that the measured magnetic field generated by the write element is above a predetermined value.

7. The apparatus for testing characteristics of a thin-film magnetic head according to claim 5, wherein the predetermined condition is that the rate of change of the measured value of the magnetic field generated by the write element, while the position of the sensor unit relative to a write element is moved, is below a predetermined value.

8. The apparatus for testing characteristics of a thin-film magnetic head according to claim 5, wherein at least one of the first, second, and third moving units includes a piezoelectric element.

9. The apparatus for testing characteristics of a thin-film magnetic head according to claim 5, wherein the evaluating unit compares a predetermined normal value and an output value from the magnetic sensor measuring the magnetic field generated by the write element.

10. The apparatus for testing characteristics of a thin-film magnetic head according to claim 5, wherein the sensor unit includes a magnetic field generator generating a magnetic field, and the evaluating unit evaluates characteristics of the read element based on the magnetic field measured by the read element.

* * * * *